(12) United States Patent
Vashisht et al.

(10) Patent No.: US 9,736,317 B2
(45) Date of Patent: Aug. 15, 2017

(54) SECURE MECHANISM FOR MUTE ALERT

(71) Applicant: Cisco Technology, Inc., San Jose, CA (US)

(72) Inventors: Vikas Vashisht, Morrisville, NC (US); Daniel Eskenazi, Capel Hill, NC (US); Pandit Panburana, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/633,969

(22) Filed: Feb. 27, 2015

(65) Prior Publication Data
US 2016/0255204 A1   Sep. 1, 2016

(51) Int. Cl.
| | |
|---|---|
| *H04M 1/00* | (2006.01) |
| *H04M 9/00* | (2006.01) |
| *H04M 7/00* | (2006.01) |
| *H04L 29/06* | (2006.01) |
| *G06F 3/16* | (2006.01) |
| *H04M 3/56* | (2006.01) |
| *G10L 21/00* | (2013.01) |
| *G10L 25/84* | (2013.01) |

(52) U.S. Cl.
CPC .......... *H04M 7/0078* (2013.01); *G06F 3/165* (2013.01); *G10L 21/00* (2013.01); *H04L 65/403* (2013.01); *H04L 65/605* (2013.01); *H04M 3/568* (2013.01); *G10L 25/84* (2013.01)

(58) Field of Classification Search
CPC ... H04M 3/568; H04M 7/0078; H04L 65/403; G10L 25/84; G06F 3/165
USPC ........................................ 379/421, 419, 422
See application file for complete search history.

(56) References Cited

U.S. PATENT DOCUMENTS

| | | |
|---|---|---|
| 3,568,176 A | 3/1971 | Schouest |
| 4,731,822 A | 3/1988 | Berry, III et al. |
| 6,763,102 B1 | 7/2004 | Chen et al. |
| 6,870,919 B2 | 3/2005 | Dobler |
| 2003/0194072 A1 | 10/2003 | MacNamara et al. |
| 2014/0200896 A1* | 7/2014 | Lee et al. ............... G06F 3/167 704/270.1 |

FOREIGN PATENT DOCUMENTS

DE      3806665 A1      9/1989

* cited by examiner

*Primary Examiner* — Thjuan K Addy (57) ABSTRACT

In one implementation, an apparatus includes an audio detection circuit, a central processor, and the switch. The audio detection circuit is configured to determine whether audio is present in an input signal and generate an audio presence indicator indicative of the audio. The central processor is configured to receive the audio presence indicator and a mute command. The central processor generates a switch command based on the mute command. The switch is configured to block the input signal from a digital signal processor in response to the switch command. The central processor generates a dynamic mute message that indicates audio is detected while a mute command is active.

20 Claims, 8 Drawing Sheets

SECURE MECHANISM FOR MUTE ALERT

TECHNICAL FIELD

This disclosure relates in general to the field of Internet telephony, and more particularly, to a secure mechanism for a mute alert for Internet telephony.

BACKGROUND

Cellular telephones, office telephones, and even home telephones may now include a mute button. When the mute button is depressed the phone stops transmitting audio from the user or surrounding noise. Mute functionality allows listening parties to prevent sounds from being transmitted from the phone. A user may press mute in order to have a quick conversation with another person in the room that the user does not want sent over the phone call. In conference calls with many participants, the aggregate noise of rustling papers or keyboards can interrupt the current speaker.

The muted audio is not received by any other parties on the conference call. However, in some scenarios the muted audio may still be processed by the telephone. If the telephone is compromised, the muted audio could be obtained by an unauthorized party using malicious software.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, an apparatus includes an audio detection circuit, a central processor, and a switch. The audio detection circuit is configured to determine whether audio is present in an input signal and generate an audio presence indicator indicative of the audio. The central processor configured to receive the audio presence indicator and a mute command, generate a switch command signal based on the mute command, and generate a dynamic mute signal based on the audio presence indicator and the mute command. The switch is configured to block the input signal from a digital signal processor in response to the switch command.

In one embodiment, an apparatus includes a processor and a memory comprising one or more instructions executable by the processor to perform generating an audio presence indicator indicative of whether audio is present in an input signal, generating a switch command in response to a mute command, and generating a dynamic mute message in response to the audio presence indicator and the mute command. The switch command prevents the input signal from being received at a digital signal processor.

Example Embodiments

One useful feature of a media device is the audio mute button. The audio mute button prevents the media device from transmitting audio to other endpoints. Users often take advantage of this feature during conference calls in order to prevent other users from hearing typing, talking or other noises, while the muted participant multitasks. However, the muted participant also may forget that mute feature has been enabled. When the muted participant speaks, the other participants receive no audio from the muted participants. Of course, the mistake is easily discovered but not before valuable time has been wasted. One solution to this problem is a passive indication for reminding the muted participant that the call is on mute. The passive indication may be a light emitting diode (LED) or an icon on the display of the media device. However, users may become accustomed to seeing the passive indication and do not realize the indication is lit when beginning to speak.

An improved approach provides a dynamic mute alert to the user. The dynamic alert is triggered only when the muted participant is speaking, or, in some examples, other sound is present in the vicinity. The media device monitors the voice activity of the user and provides the alert only when both voice activity is detected and the mute function is enabled. In order to implement this dynamic alert, the existing speech processing circuit and/or firmware processes the speech activity or other sound.

Figure 1:
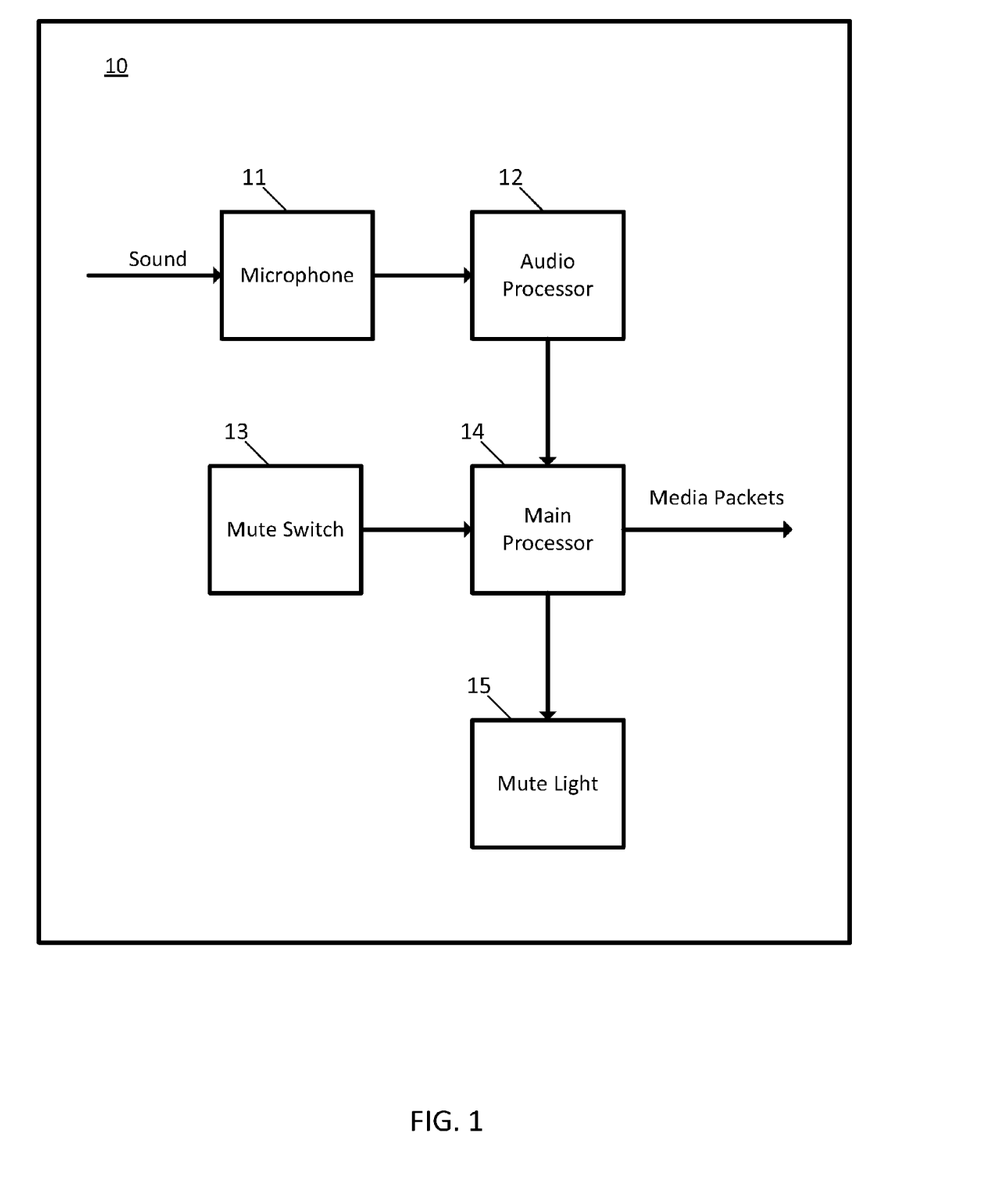
FIG. 1 illustrates an example media device with mute control.

FIG. 1 illustrates an example media device 10 with mute control. The media device 10 may include a microphone 11, an audio processor 12, a mute switch 13, a main processor 14, and a mute light 15. The microphone 11 converts sound, or vibrations caused by sound, to an electrical signal. The audio processor 13 filters or otherwise converts the sound signal to a format suitable to send the other participants. The audio processor 13 sends the sound signal to the main processor 14. The main processor 14 may determine that the sound level exceeds a certain threshold, or that speech is detected. When the main processor 14 also receives a mute signal from mute switch 13, the main processor 14 generates the dynamic alert, which is signaled by the mute alert 15.

A drawback of the dynamic mute alert is the security or privacy concerns that arise when the voice processing system receives the audio. Unauthorized users may deploy malicious software or otherwise infiltrate the media device and cause the speech processing circuit and/or firmware to transmit the muted audio to an unauthorized location. Thus, the unauthorized user can monitor the muted speech without the knowledge of the participant. The muted speech may be recorded, distributed, or analyzed by the malicious software. The malicious software may modify the software of the media device 10 to eavesdrop even while the mute alert 15 is indicating to the user that audio is muted.

The following embodiments provide a mute alert that is both dynamically responsive to speech and secure from malicious software. A separate hardware circuit that provides speech detection and/or sound level measurement is connected to the output of microphone. When the user presses the mute button, and the mute indicator is activated, the normal audio path from the microphone is disconnected via hardware logic, while the sound measurement circuit continues to monitor the speech activity. The mute indicator is wired as to be mutually exclusive of the audio path connection from the microphone to the processor. In other words, it is impossible to connect the audio path while the mute indicator is activated.

Figure 2:
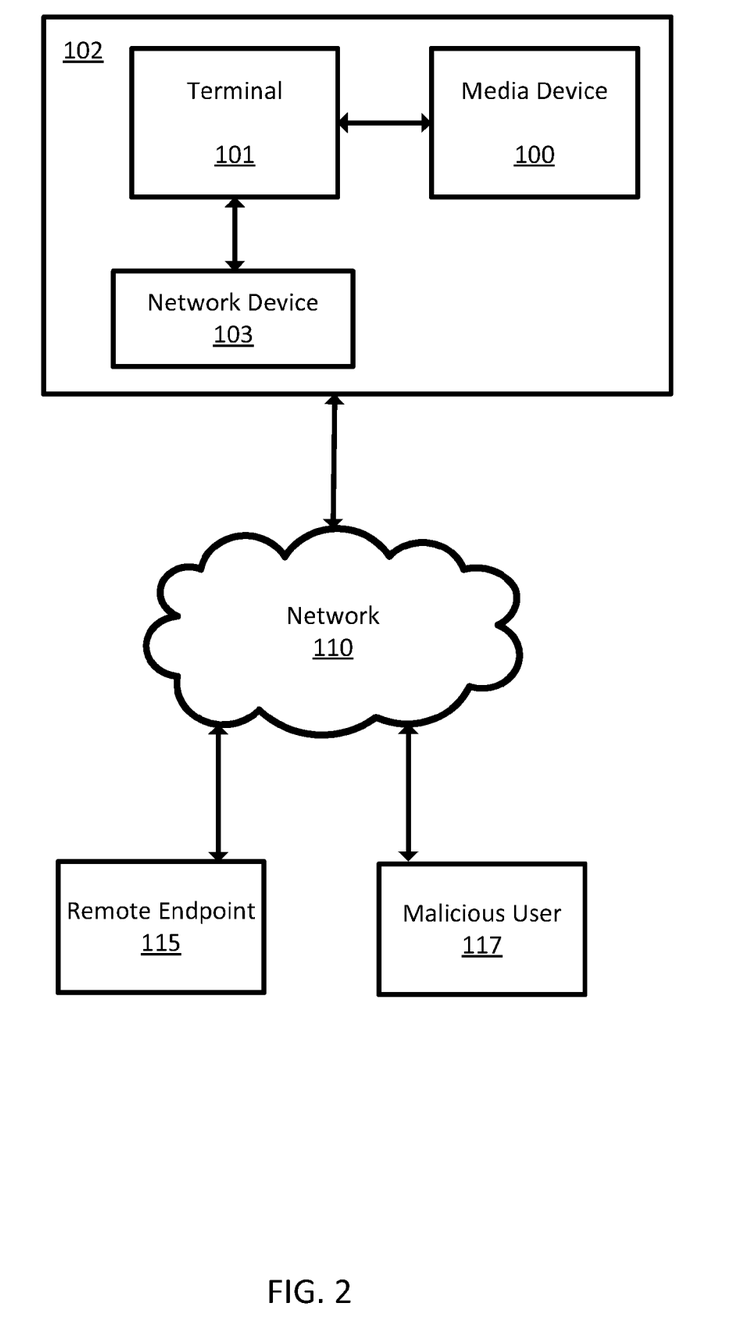
FIG. 2 illustrates an example system for a media device with mute control.

FIG. 2 illustrates a local network 102, a communication network 110, and a remote endpoint 115. A potential malicious software or malicious user 117 is also illustrated. The local network 102 includes at least the media device 100. The local network 102 may also include a terminal 101 and a network device 103. Additional, different, or fewer components may be included.

The network device 103 may include a router, a gateway, a firewall, or a data switch. The network device 103 may monitor and/or direct traffic to the media device 100 and the terminal 101. The local endpoint may include a single device such as the media device 100 or a combination of devices such as the terminal 101 and the media device 100. The terminal 101 may be a computer that executes software acting as the media device 100 or a portion of the functionality of the media device 100. The media device 100 may be a standalone IP phone. Thus, the terminal 101 may be omitted and the media device 100 is directly connected to the network 110 or the network device 103.

The media device 100 may be any device with a microphone. Examples include an Internet protocol (IP) phone, a mobile phone, a laptop computer, a tablet computer, a camcorder, a video conference terminal, a telepresence device, a digital audio recorder, or another device. The media device 100 may be connected to the Internet (e.g., network 110). The media device 100 may communicate with one or more other endpoints (e.g., remote endpoint 115) using voice over internet protocol (VoIP). In addition to other components of the media device 100, when the media device 100 is a video conference terminal or a telepresence device, the media device 100 may include a video camera configured to capture image frames of a user and a display to provide image frames from other users.

The media device 100 may initiate a media session using one or more protocols. The media device 100 may include a call manager. The call manager is hardware, or software executed by the hardware, configured to manage communication between one or more endpoints. The call manager may control call processing, routing, call options (e.g., caller identification), and telephone features (e.g., call hold, call transfer, or conferencing), device configuration, and other telephony functions and parameters.

The call manager may administer session initiation protocol (SIP), skinny client control protocol (SCCP), H.323, media gateway control protocol (MGCP), or other protocols. H.323 may be defined according to the international telecommunication union recommendation H.323 "Packet-based multimedia communication systems," as published in December 2009 and available at http://www.itu.int/rec/T-REC-H.323/. MGCP may be defined according to RFC 2805 as published in April 2000 and available at http://tools.ietf.org/html/rfc2805.

The media device 100 may generate a request message that is sent to the remote endpoint 115 via the network 110. The remote endpoint 115 may return an acceptance message to the media device 100. In response the media stream is established between the media device 100 and the remote endpoint 115.

Figure 3:
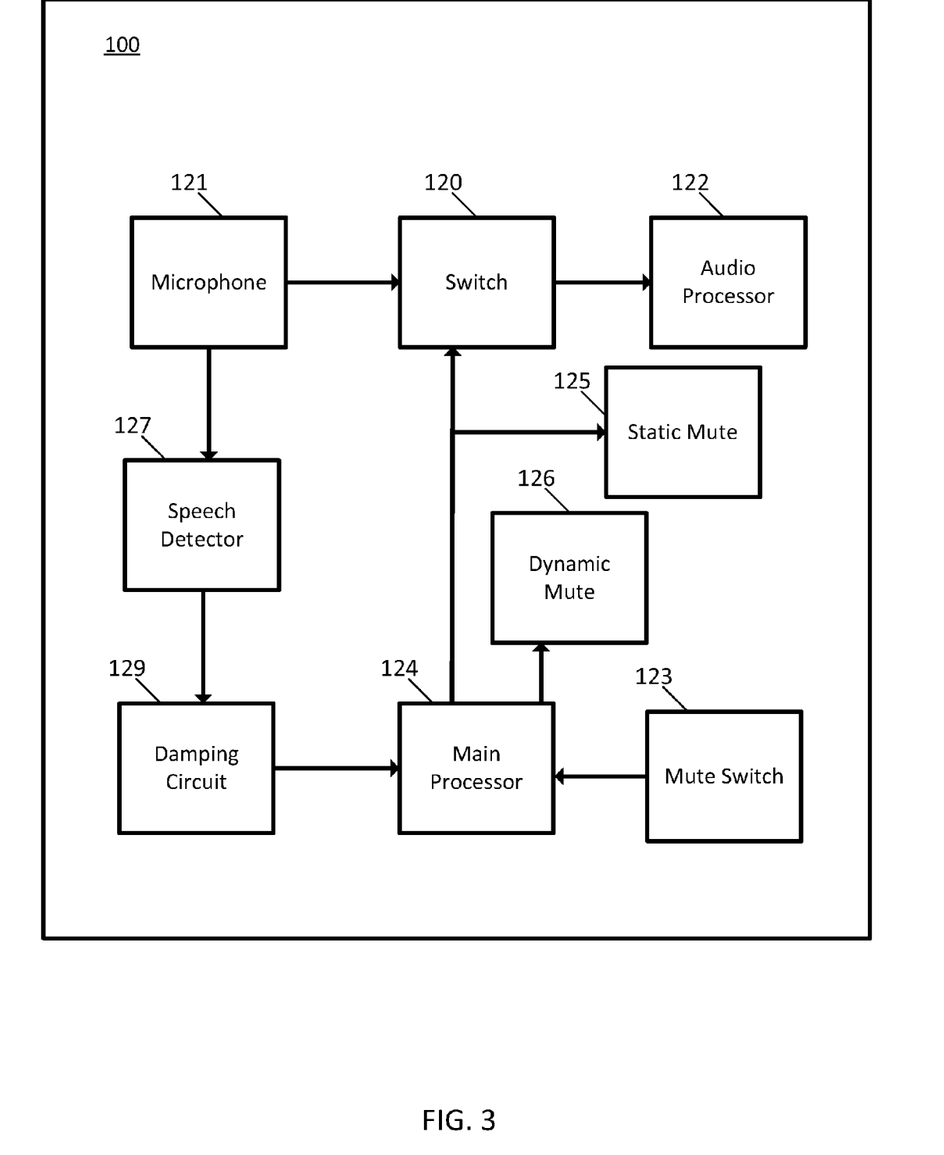
FIG. 3 illustrates a media device with a secure mechanism for mute alert.

FIG. 3 illustrates a media device 100 for dynamically providing a secure mute alert. The media device 100 includes a microphone 121, a switch 120, an audio processor 122, a speech detector 127, a main processor 124, a static mute 125, a dynamic mute 126, a damping circuit 129, and a mute switch 123. Additional, different or fewer components may be included in the media device 100.

The microphone 121 receives audio in the vicinity of the media device 100. The microphone 121 may include an acoustic-to-electric transducer or sensor that converts sound waves to electrical impulses or signals. The microphone 121 sends the electrical impulses or signals to the speech detector 127.

The speech detector 127 is an example of an audio detection circuit configured to determine whether audio is present in an input signal and generate an audio presence indicator indicative of the audio. The speech detector 127 may identify whether the audio represented by the signals from the microphone 121 include human voice. In one example the speech detector 127 outputs single bit output such as a binary signal (high or low) that indicates whether or not the audio includes speech.

The speech detector 127 may include a detection portion having one or more filters for isolating a particular range of frequencies. In one example, the filter is a low pass filter with a threshold frequency in the average spectrum for human speech. The speech detector 127 may include a damping circuit 129 configured to convert the speech to the audio presence indicator. The damping circuit 129 may sample the input signal at a rate or interval that renders the speech undecipherable. For example, the sampling rate may be 1 sample per second, resulting in a series of values which could not be reconstructed into speech that could be understood or interpreted by a human or a computer. Other examples for the sampling rate may be 2 samples per second, 4 samples per second, and 1 sample per two seconds.

In another example, the speech detector 127 may be replaced with a sensor that determines whether or not sound above a threshold decibel level is present. In any of these examples, the speech detector 127 outputs the audio presence indicator to the main processor 124, which may be referred to as a central processor.

The main processor 124 is configured to receive the audio presence indicator from the speech detector 127 and a mute command from the mute switch 123. The main processor 124 generates a switch command based on the mute command. The main processor 124 sends the switch command to the switch 120 and/or the static mute 125. The switch command instructs the static mute 125 to issue an alert. The switch command instructs the switch 120 to block the audio signal from reaching the audio processor 122. The main processor 124 does not process the input signal or the audio signals.

The main processor 124 may forward (or generate) the command for the static mute 125. The static mute 125 may include a visual alert such as an LED, a light, or a display on a screen. The static mute 125 may include an audio alert such as a bell, a ring, or a beep. The static mute 125 informs the user that the mute of the media device 100 has been activated.

The main processor 124 generates the dynamic mute 126 based on the audio presence indicator and the mute command. The dynamic mute 126 may be a signal or a message send to a display of the media device. The display may be liquid crystal display (LCD), touchscreen, peripheral monitor, or another display. The display may present a message (e.g., "mute is on while speaking") or an icon (e.g., an illustration of a person speaking). The dynamic mute 126 may be an indicator light (e.g., LED or backlight of the mute button). The dynamic mute 126 may be an audible cue (e.g., beep, chime, or announcement) that indicates to the user that mute is activated while sound or speech is detected.

Thus, the media device 100 may include two mute indicators or lights. One indicator, associated with the static mute 125 alerts the user when the mute switch 123 is activated. The other indicator, associated with the dynamic mute 126, alerts the user when the mute switch 123 is activated and speech or sound is detected from the microphone 121.

The audio processor 122 may be a digital signal processor or DSP. The audio processor 122 may segment the electrical signal from the microphone 121 into frames. The frames are packages as packets including a header and a destination address.

The switch 120 is configured to block the signal to the audio processor 122 in response to the switch command. When the switch 120 is activated by the switch command, the switch 120 disconnects the audio processor 122 from the microphone 121. The switch 120 may be a multi-state logic element or a three-state logical element. An example three-state logical element is a tri-state buffer. The tri-state buffer includes an output that has a high impedance state in addition to the low state and high state. The switch 120 may include an arrangement of flip-flops and registers. The switch command may be provided to the tri-state buffer as a first input. The electrical signal from the microphone 121 may be provided to the tri-state buffer as a second input. When the first input is low or nonexistent, the second input is passed to the output. When the first input is high, the second input is stopped from passing to the output.

In addition to a digital signal processor as the audio processor 127, a second digital signal processor may be included in the damping circuit 129. The second digital signal processor is configured to detect speech and output the audio presence indicator. The second digital signal processor may have fewer computing resources than the first digital signal processor. The second digital signal processor may have only a single processor and the second digital signal processor may have multiple processors. The second digital signal processor may have a smaller register size than a register size of the second digital signal processor. For example, the second digital processor may be 8 bit or 16 bit and the first digital signal processor may be 32 bit or 64 bit. The first digital signal processor may be operating at a higher clock speed than the second digital signal processor.

Figure 4:
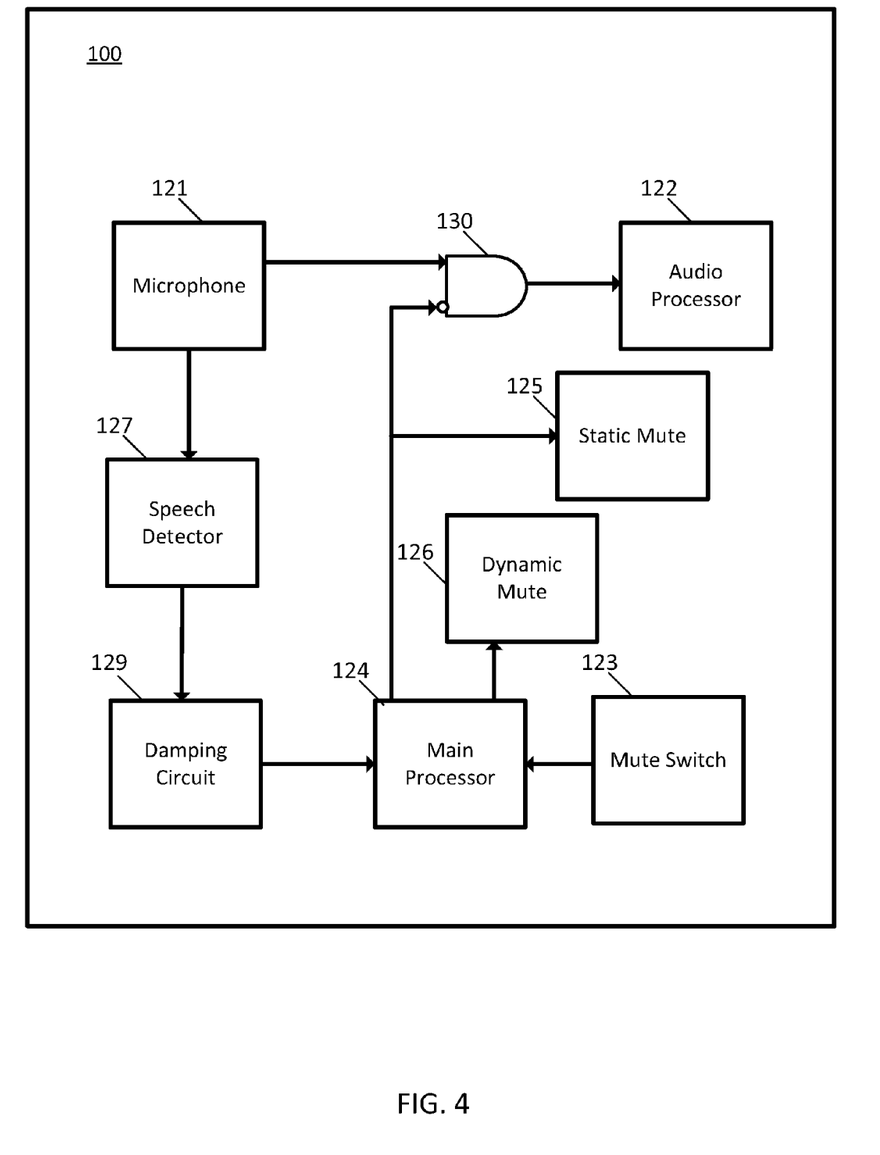
FIG. 4 illustrates another media device with a secure mechanism for mute alert.

FIG. 4 illustrates another media device 100 with a secure mechanism for mute alert. In FIG. 4, a logic gate 130 is used for the switch. The logic gate 130 may be one or a combination of gates. A first input of the logic gate 130 receives the audio presence indicator and a second input of the logic gate 130 receives the mute command. The logic gate 130 may be an AND gate with an inverted input on the input that receives the mute command from the main processor 124. The output of the logic gate 130 sends a signal that deactivates the audio processor 122.

The speech detector 127 may include an integrated circuit that is programmable with one or more thresholds or segments. For example, when the input is in a first range, a first output is provided, and when the input is in a second range, a second output is provided. One example integrated circuit is a driver IC (e.g., the LM3915 IC manufactured by National Semiconductor). A driver IC may be designed for driving LEDs or a display, but may be used for the speech detector 127. The integrated circuit may be programmed with an audio level threshold. When the audio level received from the microphone 121 reaches the audio level threshold, the output of the integrated circuit provides an indication that speech has been detected.

The damping circuit 129 receives the output of the integrated circuit. The damping circuit 129 may be a monostable (one-shot) pulse generator. The damping circuit 129 is configured to generate the speech presence indication and send the speech presence indicator to the main processor 124. The main processor 124 does not receive any further audio signal information. An example monostable pulse generator may be provided by the LTC6993 package. The monostable pulse generator may be programmable with a time interval (e.g., 1 second). For each time interval, when speech is present, the monostable pulse generator outputs a high level for the speech presence indicator. Thus, the audio is sampled based on the time interval. Thus, the main processor 124 only receives data indicative of whether or not audio has met the predetermined threshold during the previous time interval.

Other alternatives are possible for the damping circuit 129. The damping circuit 129 may be an arrangement of flip-flops. The damping circuit 129 may include one or more filters. Using any of these examples the damping circuit 129 may include an algorithm or a circuit that modifies the audio in such a way that the original audio cannot be recovered.

Figure 5:
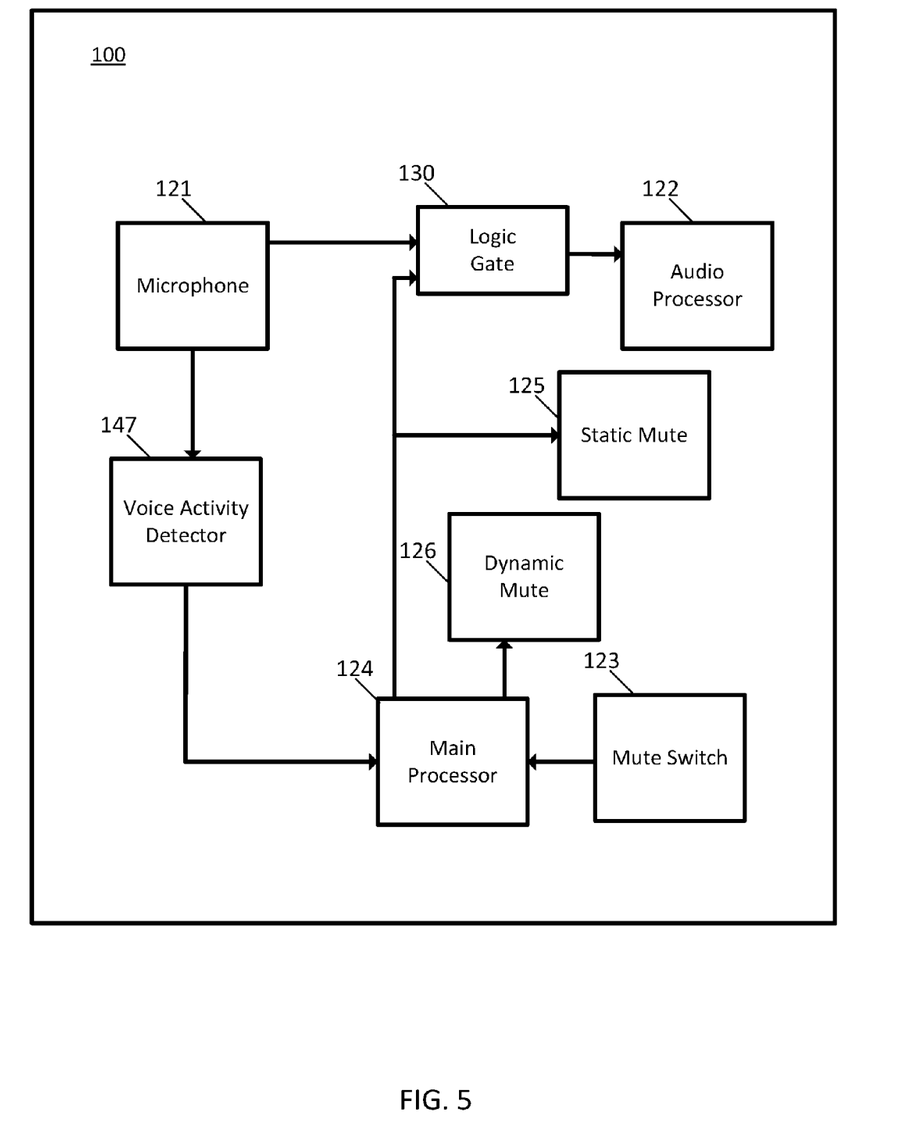
FIG. 5 illustrates another media device with a secure mechanism for mute alert.

FIG. 5 illustrates another media device 100 with a secure mechanism for mute alert. In FIG. 5, a voice activity detector 147 is used for the speech detector and the damping circuit. The voice activity detector 147 may be a single device that detects and samples speech. The voice activity detector 147 may include a digital signal processor employing a voice activity detector (VAD) algorithm. The VAD algorithm outputs an indication of whether voice activity was detected during the previous predetermined time period. The main processor 124 receives the binary status of voice activity detection. The voice activity detector algorithm provides the damping function, so no separate hardware circuit is required to provide that function.

With this implementation, the digital signal processor operates upon executable code built into the DSP. The voice activity detector 147 may include a read only memory (ROM) Including the VAD algorithm. One advantage of using ROM for storing the VAD algorithm is added security. If the VAD algorithm is downloaded by the main processor 124, or if the code for the VAD algorithm is stored in RAM accessible to the main processor 124, the secure nature of the media device 100 could be compromised by malicious code running on the main processor 124.

For example, referring to FIG. 2, if the malicious user 117 is able to infiltrate the media device 100, the malicious software will be executed by the main processor 124. Because the main processor 124 has access only the undecipherable output of the damping circuit 129, the malicious software cannot access the audio signal or the output of the microphone 121.

Figure 6:
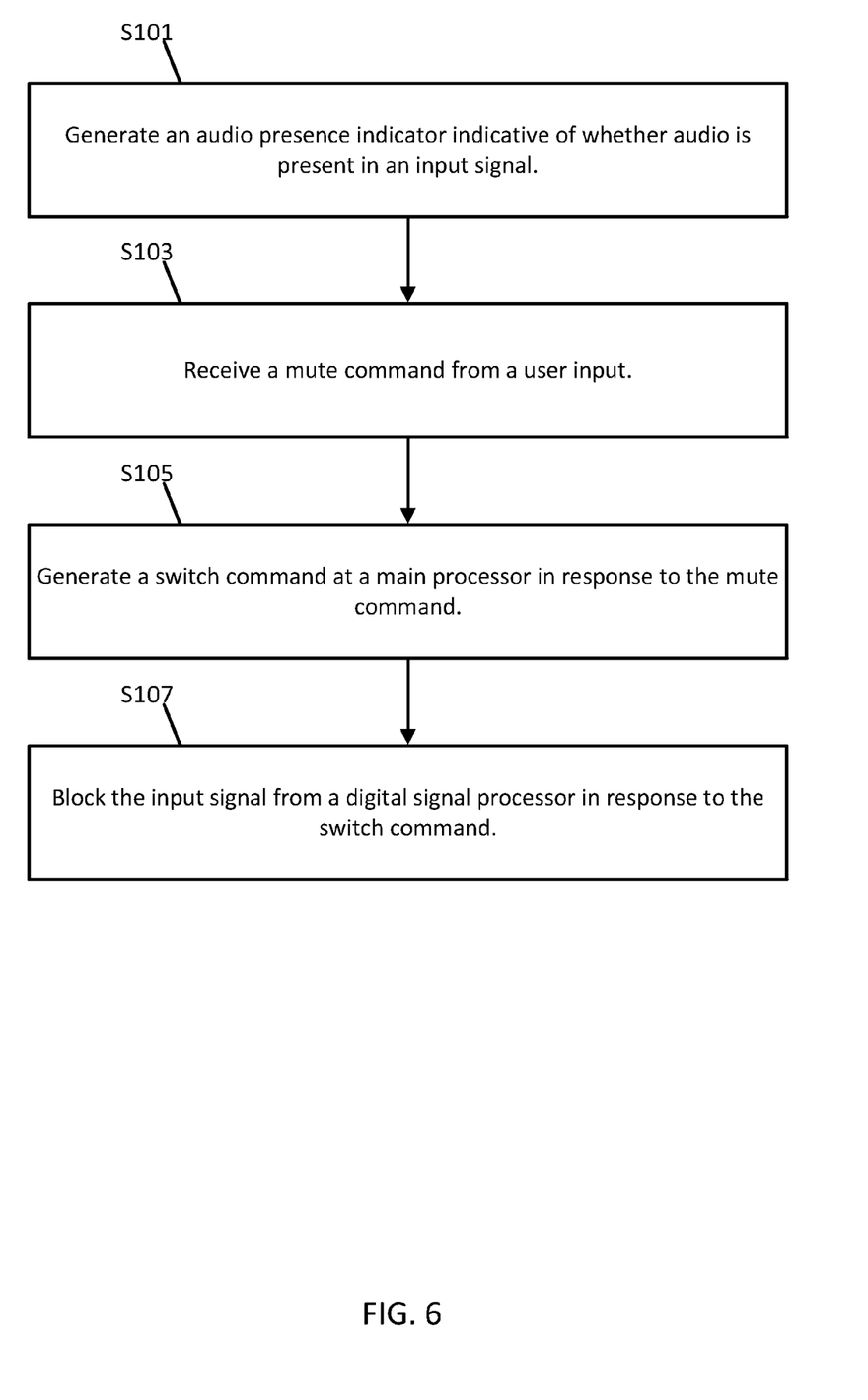
FIG. 6 illustrates an example flowchart for the media device of FIG. 1.

FIG. 6 illustrates an example flowchart for the media device 100. Additional, different, or fewer acts may be provided. The acts are performed in the order shown or other orders. The acts may also be repeated.

At act S101, the media device 100 (e.g., damping circuit 129) generates an audio presence indicator indicative of whether audio is present in an input signal. The audio presence indicator may be triggered by a predetermined frequency, voltage, or power of an input audio signal from the microphone 121. A filter may process the audio signal by passing a predetermined frequency range, and the output is compared to a threshold for the predetermined frequency range. The media device 100 may compare the audio signal to a voltage threshold or a power threshold. When the audio signal is less than the voltage threshold or the power threshold, the audio presence indicator is at a low level. When the audio signal meets or exceeds the voltage threshold or the power threshold, the audio presence indicator switches to a high value. The audio presence indicator may stay at the high value for a predetermined time period or until a periodic time interval passes.

At S103, a mute command is received from a user input. The mute command may be received at a button or a touch screen of the media device 100. The mute command may be received from an attached computer. The mute command may trigger a light or other indicator (e.g., static mute 125) when the mute command is at a high level. When the mute command is at a low level, the light or other indicator is not activated.

At S105, the media device 100 generates a switch command in response to the mute command. When the audio presence indicator is at a high level and the mute command is at a high level, the switch command is generated. At S107, the switch command is sent to a switch, which blocks the input signal from a digital signal processor (e.g., audio processor 122) in response to the switch command. The media device 100 may generate a dynamic mute signal based on the audio presence indicator and the mute command being present or at a high level.

Figure 7:
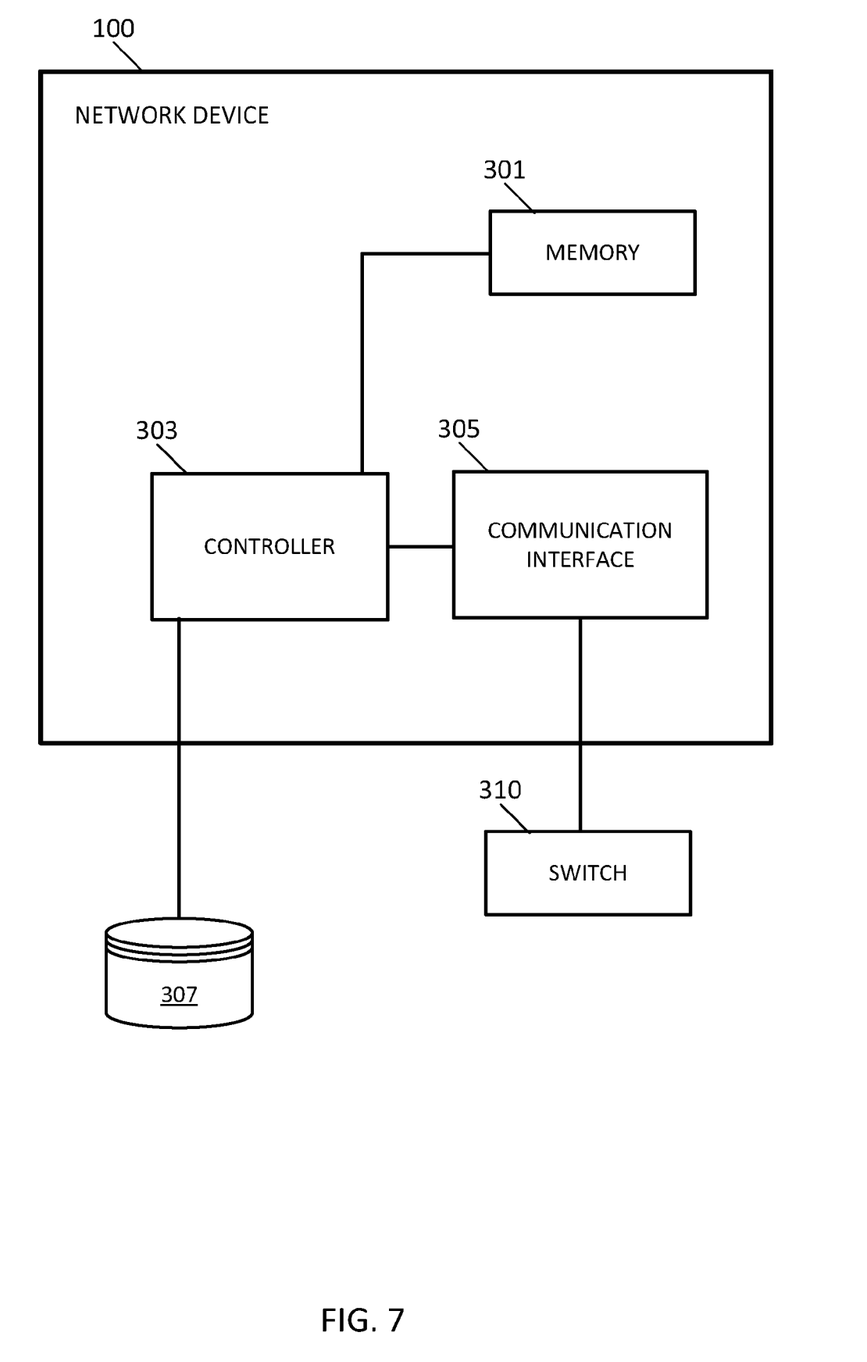
FIG. 7 illustrates an example network device at the media device of FIG. 1.

FIG. 7 illustrates an example network device as the media device 100. The network device is in communication with a network (e.g., the Internet). The network device may be a VoIP terminal or a video conference terminal. The network device includes at least a memory 301, a controller 303, and a communication interface 305. The media device 100 is in communication with a switch 310. The switch 310 is configured to block an audio signal from a digital signal processor similar to the audio processor 122 above. In one example, a database 307 may store threshold for the audio presence indicator and sampling rates for damping the audio signal. Additional, different, or fewer components may be provided. Different network devices may have the same or different arrangement of components.

Figure 8:
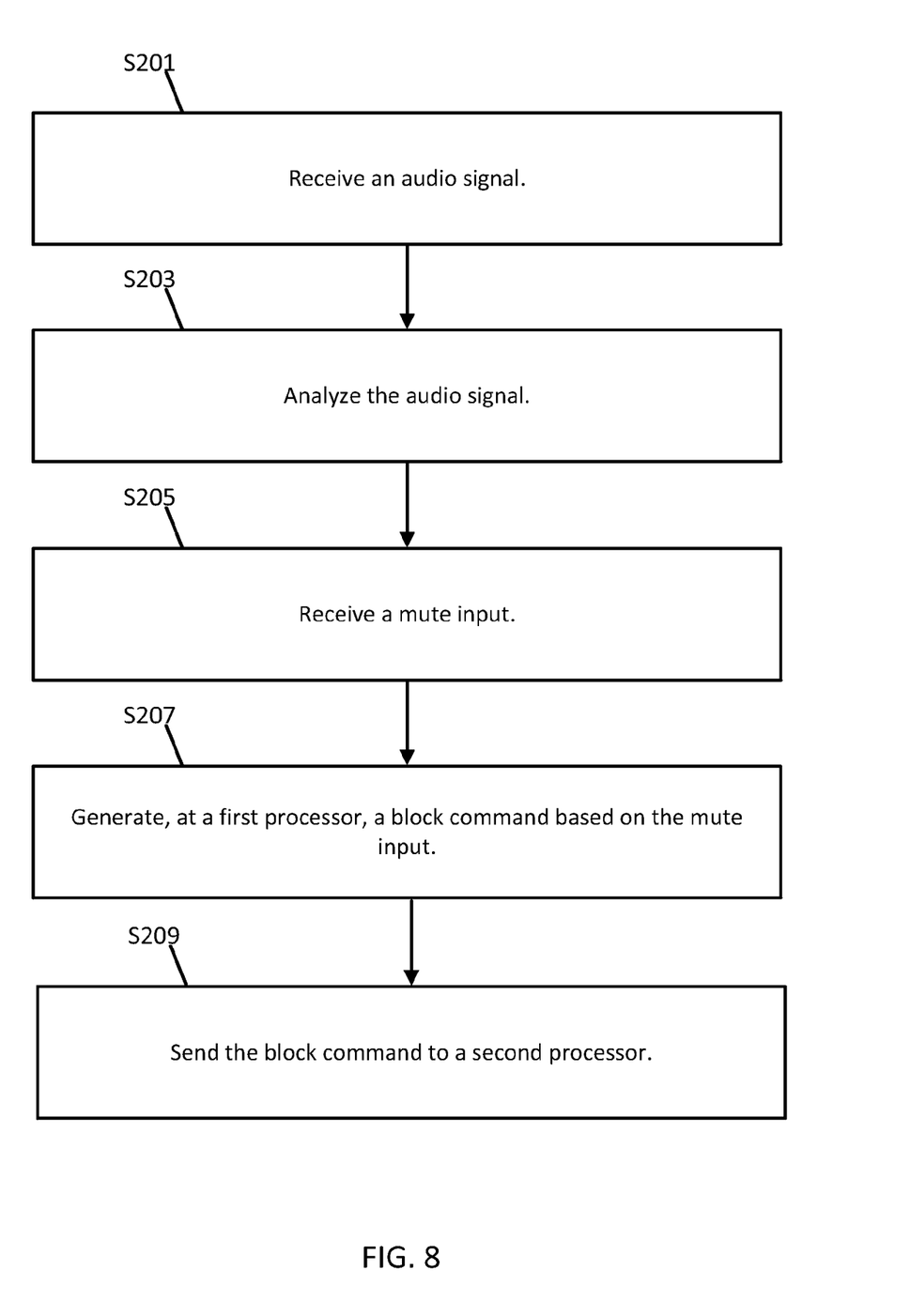
FIG. 8 illustrates an example flowchart for the network device of FIG. 7.

FIG. 8 illustrates an example flowchart for the receiving device. Additional, different, or fewer acts may be provided. The acts are performed in the order shown or other orders. The acts may also be repeated.

At act S201, the controller 303 or the communication interface 305 receives an audio signal from a microphone. The audio signal may be raw audio directly output from the microphone. The audio signal may be a particular channel of an equalizer. The particular channel may have a frequency spectrum that corresponds to human speech. An example frequency spectrum may be 100 Hz to 10 kHz or 500 Hz to 5 kHz. Other ranges are possible.

At act S203, the controller 303 analyzes the audio signal. In one example, the controller 303 analyzes the frequency of the audio signal. When the audio signal includes levels at a predetermined frequency range, the controller 303 outputs a speech signal at a constant level. In one example, the controller 303 analyzes the voltage level of the audio signal. When the audio signal includes values above the voltage level, the controller 303 outputs a speech signal at a constant level. In one example, the controller 303 analyzes the power level of the audio signal. When the audio signal includes values above the power level, the controller 303 outputs a speech signal at a constant level.

In one example, the controller 303 samples the audio signal to select and hold a value of the audio signal for a predetermined time. For example, the controller 303 generates a square wave having a predetermined period at an amplitude that changes according to the sampled value of the audio signal. When the sampled level exceeds a threshold, the controller 303 outputs a speech signal at a constant level.

In some examples, the threshold for the power level, frequency component, and power level are configurable. The threshold may be selected according to the voice spectrum of the user. For example, the media device 100 may request that a user calibrate the threshold by speaking a calibrate phrase into the microphone. The calibration phrase may include a range of phonetic sounds. The controller 303 may analyze the phonetic sounds in setting one or more of the thresholds. In another example, the threshold may be calibrated according to background noise. In some examples, the thresholds may be set according to a noise level. For example, the ambient noise of the room may be detected (e.g., by microphone 121). The threshold may be calculated by a function of the ambient noise. The threshold may be a predetermined number of decibels above the ambient noise level.

At S205, the controller 303 receives a mute input. The mute input may be received directly by the communication interface 305. The mute input may be received from another device.

At S207, the controller 303 generates a block command for the audio signal based on the mute input in S205 at the analysis (e.g., speech signal) in S203. The block signal may be generated by controller 303 but sent to another controller or processor (e.g., DSP or audio processor). When the mute input is present, the controller 303 generates the block command. The block command may be a digital signal.

The controller 303 may enter a dynamic mute mode based on the audio presence indicator and the mute command being present. In some examples, the block command may only be generated when a dynamic mute alert mode is activated. The controller 303 may include a normal mode and a dynamic mute mode. When the normal mode is selected no block command is generated. When the dynamic mute mode is activated, the controller 303 generates the block command, when appropriate according to at S207.

At S209, the controller 303 or the communication interface 305 sends the block command to switch 310. The switch 310 may be a monostable pulse generator, a logic gate, or another device that operates as a switch. When the block command is present, or at a high value, the switch 310 is configured to block the audio signal from the microphone from reaching an audio processor or DSP. The audio processor or DSP is independent from the controller 303. The term independent may refer to the controller 303 and the audio processor being different devices. The controller 303 may be embodied on one integrated circuit and the audio processor may be embodied on another integrated circuit.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
    an audio detection circuit configured to determine whether audio is present in an input signal and generate an audio presence indicator indicative of the audio;
    a central processor configured to receive the audio presence indicator and a mute command, wherein the central processor generates a switch signal based on the mute command and generates a dynamic mute signal based on the audio presence indicator and the mute command; and
    a switch configured to block the input signal from a digital signal processor in response to the switch signal.

2. The apparatus of claim 1, wherein the central processor does not process the input signal.

3. The apparatus of claim 1, wherein the audio detection circuit comprises:
    a detection portion configured to identify speech in the input signal; and
    a damping circuit configure to convert the speech to the audio presence indicator.

4. The apparatus of claim 3, wherein the converted speech cannot be modified to return to the speech in the input signal.

5. The apparatus of claim 3, wherein the damping circuit samples the input signal at a rate that renders the speech undecipherable.

6. The apparatus of claim 3, wherein the digital signal processor is a first digital signal processor, and wherein the damping circuit of the audio detection circuit comprises:
    a second digital signal processor configured to detect speech and output the audio presence indicator.

7. The apparatus of claim 6, wherein the first digital signal processor includes one or more greater processing resources as the second digital signal processor.

8. The apparatus of claim 6, wherein the second digital signal processor includes a read only memory including code to detect speech and output the audio presence indicator.

9. The apparatus of claim 1, wherein the switch is a logic gate, wherein a first input of the logic gate is the audio presence indicator and a second input of the logic gate is the mute command, wherein an output of the logic gate deactivate the digital signal processor.

10. The apparatus of claim 1, wherein the central processor sends the dynamic mute signal to a display to indicate a mute while speaking.

11. The apparatus of claim 1, wherein the audio detection circuit includes a monostable pulse generator.

12. A method comprising:
    generating an audio presence indicator indicative of whether audio is present in an input signal;
    receiving a mute command from a user input;
    generating, at a main processor, a switch command in response to the mute command;
    generating, at the main processor, a dynamic mute message in response to the audio presence indicator and the mute command; and
    blocking the input signal from a digital signal processor in response to the switch command.

13. The method of claim 12, wherein the central processor does not process the input signal.

14. The method of claim 12, further comprising:
identifying speech in the input signal; and
converting the speech to the audio presence indicator.

15. The method of claim 14, wherein the audio presence indicator is a binary signal.

16. The method of claim 12, further comprising:
sampling the input signal at a rate that renders speech undecipherable.

17. The method of claim 12, wherein the main processor is different from the digital signal processor.

18. An apparatus comprising:
a processor; and
a memory comprising one or more instructions executable by the processor to perform:
generating an audio presence indicator indicative of whether audio is present in an input signal;
generating a switch command in response to a mute command, wherein the switch command prevents the input signal from being received at a digital signal processor; and
generating a dynamic mute message in response to the audio presence indicator and the mute command.

19. The apparatus of claim 18, wherein in absence of the switch command, the input signal is received at the digital signal processor.

20. The apparatus of claim 18, wherein the dynamic mute message indicates that a mute is applied while speech is detected.

* * * * *